United States Patent [19]

Howard et al.

[11] Patent Number: 4,575,187
[45] Date of Patent: Mar. 11, 1986

[54] OPTICAL FIBER WITH EMBEDDED METAL LAYER

[75] Inventors: Richard E. Howard, Holmdel; William Pleibel, Matawan; Rogers H. Stolen, Rumson, all of N.J.

[73] Assignee: AT&T Bell Laboratories, Murray Hill, N.J.

[21] Appl. No.: 461,965

[22] Filed: Jan. 28, 1983

Related U.S. Application Data

[62] Division of Ser. No. 333,433, Dec. 22, 1981, Pat. No. 4,428,761.

[51] Int. Cl.$^4$ ............................................. G02B 5/172
[52] U.S. Cl. ............................. 350/96.33; 350/96.30
[58] Field of Search ............... 350/96.29, 96.30, 96.31, 350/96.33, 96.34

[56] References Cited

U.S. PATENT DOCUMENTS

| | | | |
|---|---|---|---|
| 3,253,896 | 5/1966 | Woodcock et al. | 350/96.29 X |
| 4,179,189 | 12/1979 | Kaminow et al. | 350/96.33 |
| 4,274,854 | 6/1981 | Pleibel et al. | 65/2 |
| 4,407,561 | 10/1983 | Wysocki | 350/96.30 |
| 4,418,984 | 12/1983 | Wysocki et al. | 350/96.33 |

FOREIGN PATENT DOCUMENTS 7602236 12/1976 Netherlands ..................... 350/96.33

OTHER PUBLICATIONS

"Low-Loss Single Polarisation Fibres with Asymmetrical Strain Birefringence", *Electronics Letters*, vol. 17, No. 15, pp. 530-531, (Jul. 23, 1981), Hosaka et al.
"Polarisation-Maintaining Single-Mode Fibre with Azimuthally Inhomogeneous Index Profile", *Electronics Letters*, vol. 17, No. 12, pp. 419-420, (Jun. 11, 1981), Kitayama et al.
"Single Mode Fibres with Asymmetrical Refractive Index Pits on Both Sides of Core", Electronics Letters, vol. 17, No. 5, pp. 191-193, (Mar. 5, 1981), Hosaka et al.
"Low-Loss Optical Waveguides with Pure Fused SiO$_2$ Cores", Proceedings of the IEEE, vol. 62, pp. 1281-1282, (Sep. 1974), Tasker et al.
"A New Technique for the Preparation of Low-Loss and Graded-Index Optical Fibers", *Proceedings of the IEEE*, vol. 62, pp. 1280-1281, (Sep. 1974), MacChesney et al.

*Primary Examiner*—John Lee
*Attorney, Agent, or Firm*—Michael J. Urbano

[57] ABSTRACT

Selected portions of the interior surface of a substrate tube, or of the cladding or core layers deposited on the interior surface of the substrate tube, are treated by one or more process steps such as shaping, diffusing, leaching, or depositing. Patterning processes such as photolithography and lift-off are employed to define the selected portions. The resulting core and/or cladding layers of the fiber can be made to have a variety of geometric shapes and composition profiles useful, for example, in realizing birefringent fibers and multiple-core fibers. Also described is the similar treating of metal layers and the incorporation of such layers into the fiber.

3 Claims, 14 Drawing Figures

OPTICAL FIBER WITH EMBEDDED METAL LAYER

This is a division of application Ser. No. 333,433 filed Dec. 22, 1981, now U.S. Pat. No. 4,428,761.

BACKGROUND OF THE INVENTION

This invention relates to the fabrication of optical fibers.

The common method of fabricating an optical fiber begins with a quartz substrate tube. A chemical vapor deposition process is used to deposit one or more glass cladding layers and then a glass core layer on the interior surface of the substrate tube. The tube is then radially collapsed by a heating process to form a preform from which the fiber is drawn.

No provision is made, however, for applying photolithographic or other patterning techniques to treat selected zones of the cladding or core layers. In particular, these layers as deposited are continuous in both circumferential and axial directions; they are not patterned to effect different fiber geometrical shapes or optical properties. Nor does their composition vary significantly in the circumferential direction.

SUMMARY OF THE INVENTION

Our method of fabricating an optical fiber begins with providing a hollow cylindrical body which may be either a single-layer body called a substrate tube or a composite-layer body made up of a substrate tube with one or more layers deposited on the interior surface of the tube. Selected portions of the interior surface of the body are treated by one or more of a variety of processing steps; e.g., by etching away the selected portions; by diffusing species therein; by leaching species therefrom; or by depositing a layer thereon. Subsequent to this treating process, the body is collapsed to form a preform and a fiber is drawn.

In one embodiment of our method of fabricating an optical fiber, at least one first layer (e.g., cladding or core layers) is deposited in the interior surface of a substrate tube, and at least one masking layer (e.g., a photoresist or metal layer) is formed on the first layer. The masking layer is patterned to form openings which expose underlying, selected portions of the first layer. These exposed portions are then treated by one or more of the process steps mentioned above. Then, the masking layer is removed and at least one second layer (e.g., cladding or core layer) is deposited on the treated first layer before radially collapsing the substrate tube and drawing the fiber.

In another embodiment of our method, the treatment of the exposed (unmasked) portions of the first layer includes deposition of at least one third layer thereon as well as on the apertured masking layer. Liftoff techniques are then employed to remove the masking layer, thereby leaving the third layer only on selected portions of the first layer (i.e., on the previously exposed portions). This approach is particularly useful where the third layer is a metal layer which itself may be used as a masking layer or may be embedded in a fiber optic device.

Our inventive method is useful, for example, in the fabrication of birefringent fibers, multiple core fibers and active fibers as described hereinafter.

BRIEF DESCRIPTION OF THE DRAWINGS

Our invention, together with its various features and advantages, can be readily understood from the following more detailed description taken in conjunction with the accompanying drawings, in which.

DETAILED DESCRIPTION

Figure 1:
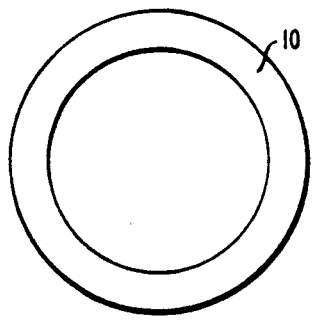
FIGS. 1-7 are end views of a substrate tube and deposited layers depicting an illustrative sequence of process steps in accordance with one embodiment of our invention.
Figure 2:
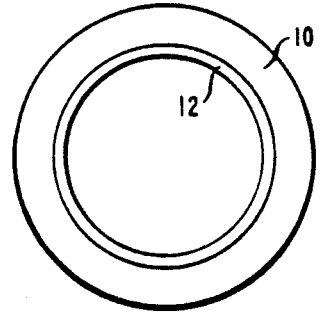
Figure 3:
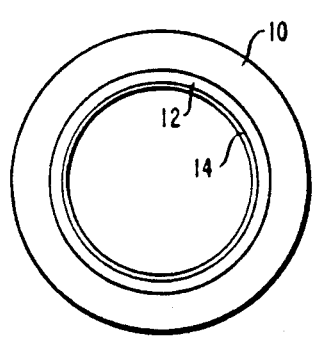
Figure 4:
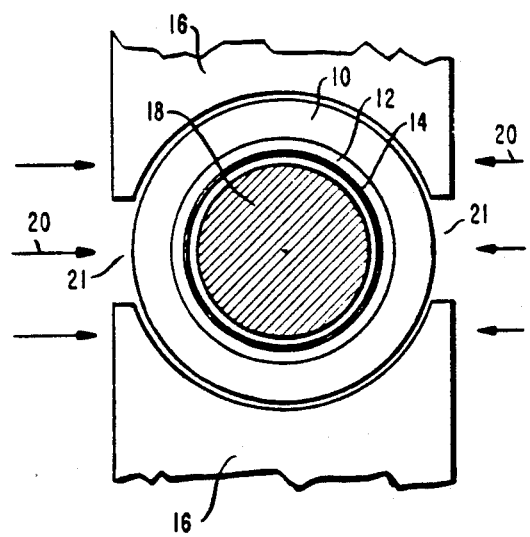
Figure 5:
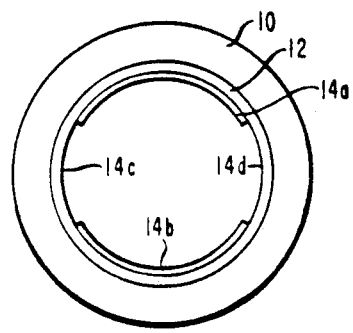

With reference now to FIGS. 1-8, our inventive method of making an optical fiber begins with providing a hollow cylindrical body which may be either a single-layer body such as a substrate tube 10 shown in FIG. 1 or a composite-layer body made up of a substrate tube 10 and one or more deposited layers 12 shown in FIG. 2. Illustratively tube 10 comprises quartz and layer 12 comprises a glass barrier layer, but in alternative embodiments described later, layer 12 may also comprise the combination of a cladding layer and a core layer or a cladding layer and a metal layer. In accordance with our invention, at least one masking layer 14 is deposited on the interior surface of the cylindrical body which in FIG. 3 means that the masking layer 14 is deposited on layer 12. Typically, masking layer 14 comprises a photosensitive material such as photoresist. The masking layer 14 is patterned so as to form openings 14c and 14d which expose underlying portions of first layer 12 as shown in FIG. 5. The remaining portions 14a and 14b of the masking layer cover the corresponding portions of layer 12 and protect them from subsequent processing steps as desired.

While the patterning of the masking layer 14 can be effected in a number of ways, one illustrative technique is depicted in FIG. 4 where a shadow mask 16 surrounds the exterior surface of substrate tube 10 except for apertures 21 which are in registration with the desired openings 14c and 14d (FIG. 5) to be formed in masking layer 14. Optical radiation 20 is directed through apertures 21 so as to expose the corresponding portions of the masking layer 14. Here, the masking layer is assumed for purposes of illustration to be a photoresist in which case the radiation 20 may be generated by a UV lamp or a UV He-Cd laser. Of course, the substrate tube 10 and layer 12 should be transparent in order to permit the radiation 20 to be transmitted therethrough and absorbed by photoresist layer 14. However, the photoresist layer does not absorb all of the radiation; some of it is transmitted into the bore of tube 10. In order to prevent this radiation from being transmitted across the bore to portions of the photoresist layer which should not be exposed, an opaque rod 18 is inserted axially in the bore. Rod 18 absorbs any such transmitted radiation.

For the same reason, the thickness of the substrate tube 10 should be made thin enough to prevent any substantial guiding of the radiation 20 around the circumference of tube 10 where it might cause exposure of portions of masking layer 14 which should not be exposed. A wall thickness-to-outside diameter ratio of tube 10 of approximately 1:9 has been found suitable in this regard, but smaller or larger ratios can also be used. In addition, this problem can be alleviated by focusing radiation 20 by means of well-known lens arrangements.

An alternative method of patterning masking layer 14 contemplates directing the radiation 20 from the interior of tube 10 rather than from the exterior as shown in FIG. 4. In this embodiment (not shown) an elongated cylindrical light source is inserted axially inside the tube 10. Also positioned inside the tube 10 and surrounding the light source is an apertured cylindrical shadow mask. Thus, radiation from the light source would be transmitted only through the apertures of the shadow mask and would expose only the portions of masking layer 14 in registration with those apertures. This technique is particularly useful where, for example, layer 12 is opaque (e.g., metallic), thus preventing masking layer 14 from being exposed from the exterior of tube 10. Of course, the exterior shadow mask 16 of FIG. 4 would not be necessary when this patterning technique is utilized.

Once the masking layer has been exposed to radiation 20, it is then subjected to a standard developer which removes the portions 14c and 14d (FIG. 5) in the case of a positive-acting photoresist. Conversely, of course, in the case of a negative-acting photoresist, the portions 14c and 14d would be resistant to the developer, whereas complementary portions 14a and 14b would be removed as is well known in the art.

Figure 6:
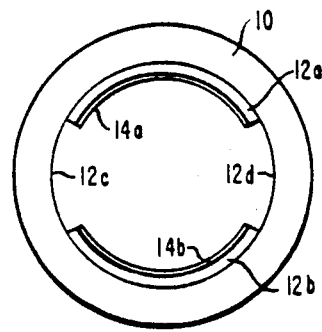
Figure 11:
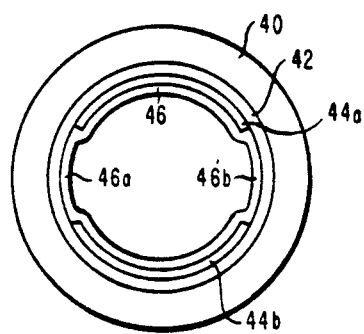
FIGS. 11-13 are end views of a substrate tube and deposited layers depicting another sequence of process steps in accordance with yet another embodiment of our invention.

After the masking layer 14 has been patterned as shown in FIG. 5, the exposed portions of layer 12 are treated by one or more processing steps. For example, the treating may include the diffusion of a particular chemical species into the exposed portions or the leaching of a chemical species from these portions. Typical of such species are boron or germanium. Alternatively, the treating of the exposed portions may include etching away those portions as shown in FIG. 6 or depositing a third layer over those portions as shown in FIG. 11. Standard etching common to semiconductor technology can be employed; e.g., wet chemical etching or plasma etching.

Figure 7:
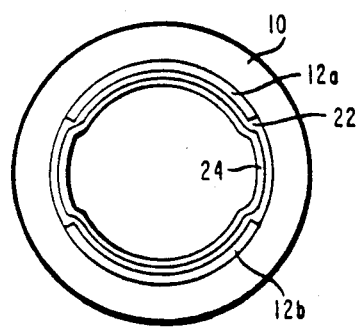

With reference to FIG. 6, where the exposed portions 12c and 12d of layer 12 have been removed by etching, the remaining portions 12a and 12b can be utilized to induce stress birefringence in a polarization-preserving optical fiber. As shown in FIG. 7, after removing the masking layer portions 14a and 14b, at least one second layer is deposited over the shaped layer portions 12a and 12b. Here, the at least one second layer includes a cladding layer 22 deposited over portions 12a and 12b and tube 10 and a core layer 24 deposited on layer 22.

Figure 8:
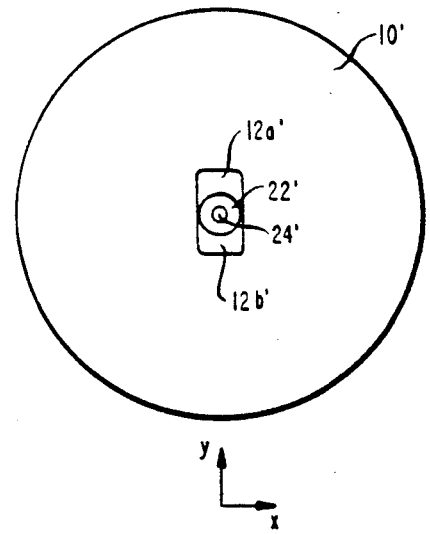
FIG. 8 is an end view of a birefringent optical fiber fabricated by the process sequence depicted in FIGS. 1-7.

At this point the substrate tube 10 with its various layers as shown in FIG. 7 is radially collapsed by a well-known heating process to form an optical fiber preform from which the optical fiber shown in FIG. 8 is drawn. The various parts of the optical fiber corresponding to the layers of FIG. 7 have been given identical reference numbers but with primed notation. In addition, for clarity of illustration, the fiber shown in FIG. 8 is depicted as having a larger diameter than the substrate tube 10 of FIG. 7, whereas in practice, of course, it has a much smaller diameter because of the collapsing and drawing process steps.

The resulting optical fiber has a core 24', an inner cladding 22', an outer cladding 10', and stress lobes 12a' and 12b'. These stress lobes cause the stress to be unsymmetric; i.e., greater in the y-direction than in the x-direction; thereby inducing birefringence in the fiber. That is, the propagation constant for the two orthogonal directions are significantly different from one another so that orthogonally polarized lightwaves are efficiently decoupled from one another. As a consequence, the polarization of a wave launched into such a fiber will be maintained over an extended length. This phenomenon is described in greater detail in U.S. Pat. No. 4,179,189 granted to I. P. Kaminow and V. Ramaswamy on Dec. 18, 1979, and in U.S. Pat. No. 4,274,854 granted to W. Pleibel and R. H. Stolen on June 23, 1981, both of which are assigned to the assignee hereof.

EXAMPLE

The following example describes the fabrication of a birefringent, polarization-preserving optical fiber of the type shown in FIG. 8. Numerical parameters and layer materials are given by way of illustration only and, unless otherwise stated, are not intended to constitute limitations upon the scope of the invention.

The substrate tube 10 was made of quartz and had an outside diameter of approximately 9.0 mm and an inside diameter of approximately 7.1 mm, giving an outside diameter-to-wall thickness ratio of approximately 9:1. The substrate tube was then mounted in an apparatus of conventional type for depositing layers of chemicals on the inside of the substrate tubing. The apparatus is basically a converted glass blowing lathe in which the substrate tube is mounted in the conventional feedstock position and a gas heater is mounted on the tool drive. The interior of this substrate had been cleaned with commercial glass cleaner and distilled water and dried with a flow of nitrogen gas. After being placed in the apparatus, the tube was heated for cleaning purposes while a mixture of 250 cc/min oxygen and 825 cc/min helium flowed through it.

An outer layer 12 was deposited on the interior surface of tube 10 by flowing 250 cc/min oxygen, 76 cc/min of 2% silane in helium mixture, 27 cc/min of 0.5% diborane in helium and 825 cc/min of helium at a temperature suitable for modified chemical vapor deposition (MCVD) for 3 hours and 37 minutes. During this time the torch made 21 passes each 53.3 cm long. The resulting layer 12 comprised a borosilicate layer approximately 28 $\mu$m thick.

After layer 12 was deposited, the substrate tube 10 was removed from the lathe and mounted vertically in preparation for the photoresist coating process. The interior surface should be free from moisture. To this end the photoresist coating should be done properly after the deposition of layer 12; otherwise the substrate tube should be baked out at several hundred degrees centigrade. The photoresist liquid was injected into the top of the tube 10 and allowed to flow out of the bottom. (However, spin coating the photoresist by rotating the substrate tube is also suitable.) After drying, the photoresist layer 14 was estimated to be a few micrometers thick. The tube was then baked at 70 degrees C. in air for 30 minutes. We utilized HPR 206 photoresist manufactured by the Hunt Chemical Company although other commercially available photoresists are suitable (e.g., HPR 204 or Shipley AZ2400).

After exposure to ultraviolet radiation utilizing shadow masking techniques of the type depicted in FIG. 4 (mask 16 was actually opaque tape adhered to tube 10), the photoresist layer 14 was developed by immersion in a 0.13M solution of KOH in H$_2$O, although commercially available developers are also suitable.

In practice we found it advantageous to deposit the photoresist layer 14 as a plurality of thinner photoresist layers with the process sequence of photoresist coating, ultraviolet exposure, developing, and baking at about 190 degrees C. for 1 hour in air, being repeated for each thin layer. The resulting patterned photoresist layer 14a and 14b is shown in FIG. 5.

Next the exposed portions of the layer 12 were etched with a 47% solution of HF in H$_2$O as shown in FIG. 6. The remaining portions of photoresist were removed using a commercial remover agent. Alternatively, the photoresist may be removed by heating in an oxygen ambient or by simply soaking the photoresist in water and heating to about 200 degrees C.

At this point the substrate tube was returned to the vapor deposition apparatus and again mounted in the lathe. A silica cladding layer 22 about 16 $\mu$m thick, as shown in FIG. 7, was then deposited by flowing 77 cc/min of 2% silane in argon (not critical; helium could be used) through the tube 10. After partially collapsing the tube, a germanium silica core layer 24 was deposited by flowing 250 cc/min of oxygen, 39 cc/min of 2% silane and argon, and 825 cc/min of helium for 27 minutes. Both the cladding 22 and the core 24 were deposited at the same rates as before. The substrate tube 10 was then collapsed in one pass to form a preform having an outer diameter of about 5.2 mm. The preform was then drawn into a fiber by conventional means. The fiber, which was about 99 $\mu$m in outside diameter, is shown in end view in FIG. 8.

Details of the MCVD process used to form the outer, cladding, and core layers may be found in "A New Technique for the Preparation of Low-Loss in Graded Index Optical Fibers," J. B. MacChesney et al., *Proceedings of the IEEE*, Vol. 62, p. 1280 (1974), and "Low-Loss Optical Wave Guides with Pure Fused SiO$_2$ Cores," G. W. Tasker et al., *Proceedings of the IEEE*, Vol. 62, p. 1281 (1974).

After collapsing the tube 10 and drawing the preform, the resulting optical fiber had a configuration approximated by the end view shown in FIG. 8. The outside diameter was about 99 $\mu$m, the cladding 22' was approximately rectangular (9.0$\times$6.5 $\mu$m), the core 24' was also rectangular (3.6$\times$2.5 $\mu$m) and the stress lobes 12a' and 12b' measured approximately 24 $\mu$m from tip to tip in the y-direction. A fiber so fabricated was tested and found to have a birefringence of dn$=9.9\times10^{-6}$. The birefringence dn is expressed as an index difference for the orthogonally polarized waves with polarizations along the fiber's principal axes. Increasing the birefringence increases the fiber's ability to maintain linear polarization. We expect that the birefringence can be increased by increasing both the stress layer 12 thickness and the boron concentration, as well as by adding other dopants, such as germanium or phosphorus during the deposition of layer 12. It should be noted that we have found that the core 24' is not round but approximately square.

MULTIPLE CORE OPTICAL FIBER

Figure 10:
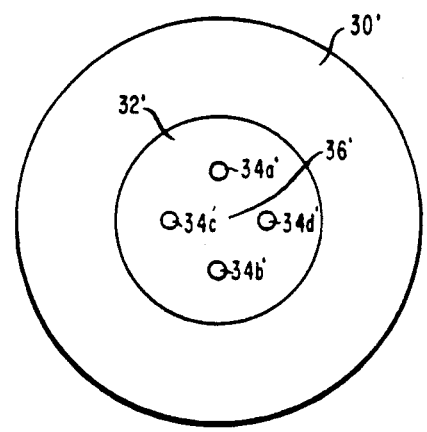
FIG. 10 is an end view of a multiple core optical fiber fabricated from the processed substrate tube of FIG. 9.

Our inventive technique of patterning layers on the interior surface of a substrate tube can be utilized to fabricate an optical fiber having a plurality of cores 34a', 34b', 34c', and 34d' as depicted in FIG. 10. Four such cores are shown for the purpose of illustration only. More or fewer cores can be fabricated depending upon the desired application.

Figure 9:
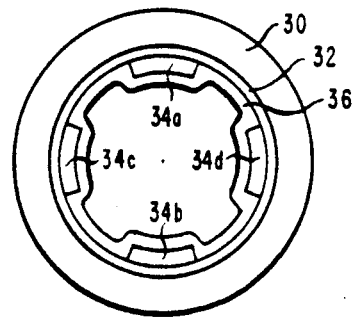
FIG. 9 is an end view of a processed substrate tube and deposited layers fabricated in accordance with another embodiment of our invention.

In order to realize such an optical fiber, the layers deposited on the interior surface of a substrate tube 30 are patterned as shown in FIG. 9. That is, a cladding layer 32 is first deposited on the interior surface, and then a core layer 34 is deposited by the usual chemical vapor deposition process. Using patterning techniques in accordance with our invention, the core layer 34 is shaped into four segments, 34a, 34b, 34c and 34d. Subsequently, a second cladding layer 36 is deposited over the segmented core layer as well as over the exposed portions of the first cladding layer 32. The cladding layer 36 serves primarily the function of preventing the core segments from running together when the substrate tube is collapsed. Upon collapsing the substrate tube and drawing the preform, a fiber having an end view as shown in FIG. 10 results. Although the cores are depicted as being round, their actual shape after collapsing depends upon their shape before collapsing as well as the composition of the deposited layers and the conditions under which they are deposited and under which the tube is collapsed.

OPTICAL FIBERS WITH PATTERNED METALLIZATION

As alluded to earlier, not all of the layers deposited on the interior surface of the substrate tube need be glass layers of the type used to form the cladding or core of an optical fiber. Rather, metal layers may also be deposited on the interior surface and may be employed either as masking layers, in which case they are typically removed after serving their masking function. Alternatively, the metal layers are embedded in the final optical fiber product.

Consider the masking function of a metal layer first. As shown in FIG. 11, a substrate tube 40 has deposited on its interior surface a glass cladding layer 42. Using patterning techniques in accordance with our invention, a photoresist layer 44 is formed on cladding 42 an is photolithographically etched to leave photoresist masks 44a and 44b on the cladding 42. A metal layer 46 is then deposited over the photoresist masks 44a and 44b as well as over the exposed portions of the cladding layer 42. Suitable methods of depositing the metal layer 46 include spin coating, electroless deposition, and vacuum evaporation. For example, copper and platinum can be deposited electrolessly, and chromium can be evaporated. In the latter case, one technique is to insert a chromium plated-tungsten rod into the bore of substrate tube 40 and then to heat the rod in a vacuum chamber.

Figure 12:
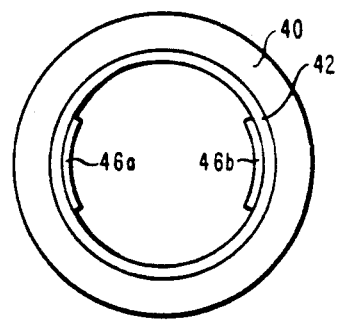

Next the photoresist portions 44a and 44b are subjected to a suitable etchant so as to dissolve the photoresist and lift off the overlying portions of the metal layer. As a consequence, only the metal layer segments 46a and 46b remain on the cladding layer 42 as shown in FIG. 12. It should be noted that the lift-off etchant is able to attack the covered photoresist either from the ends of the tube 10 or directly through the metal layer if it is thin enough to have microscopic pin-holes, as would be the case for a 5 μm thick photoresist and a 1 μm thick metal layer.

These metal layer segments may themselves now be used as masks for treating the exposed portions of cladding layer 42. This process might be attractive, for example, where the cladding layer glass is sufficiently etch resistant that it cannot be selectively etched using a photoresist mask but could be so etched using a more etch-resistant mask such as the metal layer segments 46a and 46b.

Figure 13:
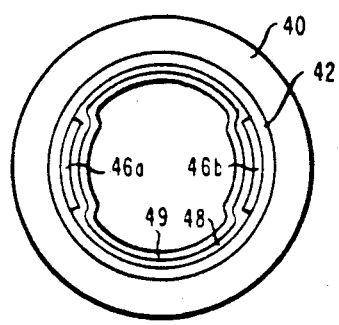
Figure 14:
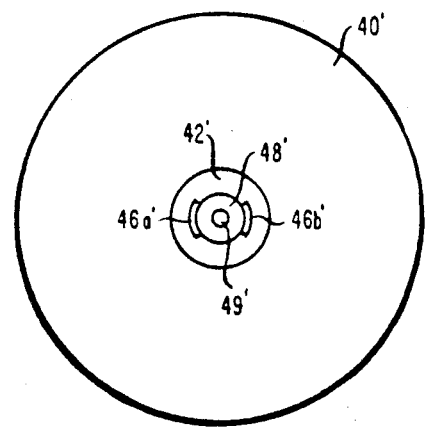
FIG. 14 is an end view of an optical fiber having embedded metal layers fabricated by the process depicted in FIGS. 11-13.

Alternatively, the metal layer segments 46a and 46b may be incorporated as embedded layers into an active optical fiber as shown in FIG. 14. There, segments 46a' and 46b' are contiguous with cladding layer 48' which surrounds core 49'. As shown in FIG. 13, the optical fiber of FIG. 14 can be realized by depositing a second cladding layer 48 and then a core layer 49 over the metal segments 46a and 46b as well as over the exposed portions of the first cladding layer 42. Upon collapsing the substrate tube 40 and drawing the preform, the optical fiber of FIG. 14 results. The embedded metal layer segments can serve a number of illustrative functions; for example, as floating electrodes when an electric field is applied across the fiber, or as polarization selectors for suppressing optical waves with polarization parallel to the metal layers.

In these embodiments it might be advantageous to perform the collapsing step under vacuum conditions, a well-known technique which enables the preform to be formed at lower temperatures. Lower temperatures might be useful in controlling the melting of the metal layers.

It is to be understood that the above-described arrangements are merely illustrative of the many possible specific embodiments which can be devised to represent application of the principles of our invention. Numerous and varied other arrangements can be devised in accordance with these principles by those skilled in the art without departing from the spirit and scope of the invention. In particular, although our invention has been described with respect to patterning the interior surface of a substrate tube and layers around the circumference of the interior surface of a substrate tube, we also contemplate that such patterning can be performed in the axial direction along the tube. In addition, analogous to the manner in which chips are cut from a semiconductor wafer, we further contemplate that fibers fabricated pursuant to our invention can be cut into separate fiber segments each of which constitutes a separate fiber optic device.

What is claimed is:

1. An optical fiber including an interior portion for guiding lightwaves and a metal layer embedded in said interior portion,
    said metal layer extending axially along said fiber,
    said interior portion of said fiber comprising
    a glass core,
    a glass cladding surrounding said core, and wherein
    said metal layer is embedded in said cladding.
2. The fiber of claim 1 wherein said cladding comprises
    an inner cladding,
    an outer cladding, and wherein
    said metal layer is located at the interface between said inner and outer claddings.
3. The fiber of claim 1 or 2 wherein said metal layer comprises a plurality of spatially separate metal segments positioned circumferentially around said fiber.

* * * * *